United States Patent [19]

Fanta et al.

[11] Patent Number: 4,605,640

[45] Date of Patent: Aug. 12, 1986

[54] OIL-ABSORBENT CELLULOSIC DERIVATIVES

[75] Inventors: George F. Fanta, Peoria; William M. Doane, Morton, both of Ill.

[73] Assignee: The United States of America as represented by the Secretary of Agriculture, Washington, D.C.

[21] Appl. No.: 738,815

[22] Filed: May 29, 1985

[51] Int. Cl.$^4$ .............................................. B01D 17/04
[52] U.S. Cl. .................................... 502/402; 502/404; 252/344
[58] Field of Search ................................ 502/402, 404

[56] References Cited

U.S. PATENT DOCUMENTS 3,591,524 7/1971 Eriksen ........................... 502/404 X
3,880,613 4/1975 Oswald et al. .......................... 44/62

FOREIGN PATENT DOCUMENTS 1041548 9/1983 U.S.S.R. ............................... 502/404

Primary Examiner—Patrick P. Garvin
Attorney, Agent, or Firm—M. Howard Silverstein; David G. McConnell; Curtis P. Ribando

[57] ABSTRACT

Ionic cellulose-containing substrates reacted with a fatty quaternary ammonium salt such as hexadecyltrimethylammonium bromide have the proper balance of hydrophilic and hydrophobic properties to absorb oil from oil-containing emulsions. Suitable ionic cellulose-containing substrates include agricultural residues, wood dust, acid-derivatized cellulose, and cellulose graft copolymers. These products are useful for cleaning up oil spills and for removing entrained oil from waste water.

8 Claims, No Drawings

OIL-ABSORBENT CELLULOSIC DERIVATIVES

BACKGROUND OF THE INVENTION

1. Field of the Invention

Considerable research has been devoted to developing oil absorbents for cleanup of oil spills and removal of emulsified oil from waste water. Agricultural products and residues, such as kapok fiber, cotton, rice hulls, corn cob meal, bagasse fibers, and peat moss have been used for these applications, and these materials have the advantage of being inexpensive and readily available. Moreover, cellulosic products exist in fibrous form and can be easily formed into mats, pads, and nonwoven sheets. Mats and column packings for oil removal have also been prepared by mixing cellulosic fibers with synthetic fibers, e.g., polyethylene or polypropylene-polyethylene-nylon blend. Cellulosics have also been mixed with inorganic materials, such as clay, magnesium hydroxide, and alumina to give oil-absorbent compositions. This invention relates to enhancing the oil absorbencies of cellulosic materials by rendering them more hydrophobic; that is, more lipophilic.

2. Description of the Prior Art

The hydrophobicity of cellulosic materials (and thus their affinity for oil) has been increased by reaction with organic isocyanates (Holst et al., German Offen. 2,358,808) and with fatty acid derivatives, such as anhydrides (Ball et al, U.S. Pat. No. 3,770,575) and acid chlorides (Teng et al., U.S. Pat. No. 3,874,849). Also, Marx et al. (U.S. Patent No. 3,677,982) shows preparing an oil-absorbing cellulose-polystyrene composite by immersing a cellulose sponge into styrene-benzoyl peroxide and then heating the mixture to 100° C.

Coating cellulosics with hydrophobic compounds, such as paraffin wax (Peterson et al., U.S. Pat. No. 3,630,891; Matsuda et al., Japanese Kokai 77/76,285; and Orth, German Offen. 2,301,176), insoluble fatty acid salts (Aoso et al., Japanese Kokai 74/64,577), or low melting polymers, such as polyolefins (Kunitomo et al., German Offen. 2,621,961; and Saida et al., Japanese Kokai 78/04,760) is another technique used to increase the affinity of fibers for oil; some polymers (e.g., ethylene-vinyl acetate copolymer) also have been deposited onto fibers from aqueous emulsions (Sato et al., Japanese Kokai 77/89,244; and Sato et al., Japanese Kokai 77/90,486).

SUMMARY OF THE INVENTION

We have now discovered that cellulose-containing substrates having a suitable degree of cation exchange capacity can be modified by reaction with a fatty quaternary ammonium salt to produce products having the proper balance of hydrophilic and lipophilic properties to effectively absorb oil from oil-in-water emulsions. The necessity for this hydrophilic-lipophilic balance has not been previously recognized in the prior art. The unique products of this invention are prepared from cellulose-containing substrates which have been treated to render the fibers more hydrophobic, i.e., lipophilic, and to give the fibers enough ionic character so that they will swell and separate in an aqueous environment to provide maximum surface area for oil removal. These products are particularly useful for cleaning up oil spills and for purifying waste water emulsions.

In accordance with this discovery, it is an object of the invention to provide a practical method for purifying oil-contaminated water.

It is also an object of the invention to prepare an oil-absorbing agent from readily available cellulose-containing source materials.

Another object of the invention is to produce an oil-absorbing composition by a simple, inexpensive, and commercially attractive procedure.

Other objects and advantages of the invention will become readily apparent from the ensuing description.

DETAILED DESCRIPTION OF THE INVENTION

The cellulose-containing material for use in the invention can be derived from any known source, including natural lignocellulosic materials such as wood, grasses, and agricultural residues. Woody substrates include sawdust and pulp from both deciduous and coniferous species. Nonwoody substrates may be obtained from monocotyledenous plants, especially grassy species belonging to the family Gramineae. Of primary interest are agricultural residues; that is, leaf, stalk, and other portions of grain-bearing grassy plants which remain after harvesting the seed. Illustrative of such residues without limitation thereto are wheat straw, oat straw, rice straw, barley straw, rye straw, buckwheat straw, flax straw, corn stalks, corn cobs, corn husks, and the like.

It is essential that the substrate have cationic exchange properties in order to enable reaction with the fatty quaternary ammonium salt. Most of the aforementioned natural materials in the dried state inherently have sufficient exchange capacity for purposes of this invention. The ionic substituents may be appended to either the cellulose backbone itself or to some other molecular entity in the substrate (e.g., hemicellulose or lignin).

Also envisioned for use herein are certain derivatized cellulose-containing materials having a relatively low degree of substitution (D.S.); that is, a D.S. of less than about 0.1. Examples of this category are carboxymethylcellulose and carboxymethylated straw. Alternatively, the substrates may be derivatized with a polymeric carboxylic acid or a polymeric sulfonic acid. Accordingly, graft copolymers may be formed from compounds such as acrylic acid, 2-acrylamido-2-methylpropanesulfonic acid, or methyl acrylate. An amount of added acid or ester in the range of about 1-8% by weight of the final product will give a D.S. in the desired range. The acid is then converted to a sodium or potassium salt by treatment with mild alkali. The ester would, of course, have to be saponified prior to conversion to the quaternary ammonium salt.

The quaternary ammonium salt reacted with the ionic cellulose substrate is represented as follows:

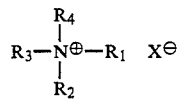

wherein $R_1$, $R_2$, $R_3$, and $R_4$ are independently selected from hydrogen, straight chain or branched alkyl, alkenyl, aryl, or alkyl aryl groupings, either substituted or unsubstituted, with the proviso that at least one of the groups individually, or more than one of the groups collectively, yields a lipophilic moiety; and wherein X is a labile anion.

Examples of quaternary ammonium salts include hexadecyltrimethylammonium bromide (CTAB), dimethyl di(hydrogenated tallow) quaternary ammonium chloride, trimethyl tallow quaternary ammonium chloride, dimethyl dicoco quaternary ammonium chloride, and monococo trimethyl quaternary ammonium chloride.

A sufficient amount of the quaternary ammonium salt is combined with the substrate in a reaction medium to impart the requisite lipophilicity to the substrate in accordance with the intended end use. The ion exchange reaction typically will not go to completion, thereby leaving a portion of the reactive sites in the acid or alkali metal salt form. The converted substrate is thereafter washed, filtered, and stored. The product may optionally be dried, but storage in a damp or wet state facilitates dispersion in the aqueous emulsion at the time of use.

The actual oil-absorbing capacity of the instant products is, of course, a function of the number of lipophilic groups on the polymer. The polymer, however, must also be sufficiently hydrophilic to permit separation and limited swelling of individual fibers. This hydrophilicity is attributed to the ionic nature of the final product and the limited D.S. If the D.S. is excessive, swelling is inhibited and the lipophilic groups are inaccessible to the oil.

The following examples are intended only to further illustrate the invention and are not intended to limit the scope of the invention which is defined by the claims.

EXAMPLE 1

Ten grams (dry weight basis) of wheat straw which had been ground through a Wiley mill with a 2-mm. screen and washed with water was combined with 56 ml. of 0.24 N sodium hydroxide and then held for 2 hours in an oven at 100° C. The reaction mass was diluted with 250 ml. of water and stirred in a Waring blender at high speed for 2 min. The solid was separated by filtration, washed with water, and stored as a moist solid. A portion of this material was tested as a control for oil absorbency. Twenty grams of this solid (4.1 g., dry weight basis) was stirred at room temperature for 2 hours with a solution of 2.5 g. of CTAB in 50 ml. of water. The product was thereafter recovered by filtration, washed with water, and with a 50:50 ethanol:water mixture. The final traces of unreacted CTAB were removed by continuous Soxhlet extraction for 24 hours with 95% ethanol. The product was then washed thoroughly with water and stored as a moist solid.

The absorbencies of both the control material and the CTAB-reacted product were measured as follows:

An emulsion was prepared by adding 200 ml. of water, 20 drops (0.5–0.6 g.) of mineral oil, and 0.1 g. of dodecylbenzene sodium sulfonate to a Waring blender and stirring at high speed for 2 min. Ten milliliters of oil emulsion and 0.50 g. (dry basis) of test material were placed in a 2-oz. screw-cap bottle and shaken periodically for 5 min. Supernatant was separated from fibrous solid by screening through a small Büchner funnel containing no filter paper. Percent transmission of the supernatant (% T) at 650 nm. was then determined in a 1-cm. ultraviolet cell. Supernatant from the ultraviolet cell was returned to the bottle, and an additional 5 ml. of oil emulsion was added. The mixture was shaken, and % T was again determined. This procedure was repeated with 5-ml. increments of emulsion until % T dropped to about 10 or less. The % T of the supernatant was plotted against the total volume of oil emulsion added to the solid. The volume of emulsion which would yield 50% T was then determined from the plot and reported in Table I, below.

EXAMPLE 2

The procedure of Example 1 was repeated except that the NaOH treatment was conducted at room temperature (25° C.) for 1 hour. The results are reported in Table I.

EXAMPLES 3–4

The procedures of Examples 1 and 2 were repeated except that water was substituted for the NaOH treatment, and in Example 4 the water treatment was continued for 64 hours. The results are reported in Table I.

EXAMPLES 5–6

The procedure of Example 1 was repeated except that oak and pine sawdust were substituted for the wheat straw. The results are reported in Table I.

EXAMPLE 7

Carboxymethylcellulose (14.7 g.; 4.0 g. dry weight basis) having a D.S. of 0.028 was blended in 200 ml. of water, and the pH was adjusted to 9 with 1 N NaOH. Into the mixture was blended 4.0 g. of CTAB, and blending was continued for 5 min. The product was recovered by filtration, washed three times with a 50:50 ethanol:water mixture, and then washed three times with water. The final traces of unreacted CTAB were removed by continuous Soxhlet extraction overnight with 95% ethanol. The product was then washed thoroughly with water and stored as a moist solid. The absorbency was determined by the procedure described in Example 1. Approximately 88 ml. of oil emulsion were absorbed before the transmittance dropped to 50%.

EXAMPLE 8

Thirty grams (dry weight basis) of bleached softwood pulp (85.8% α-cellulose, 0.06% lignin, 13.6% pentosans) was dispersed in water, filtered, and pressed as dry as possible. A solution of 20.0 g. of acrylic acid in 120 ml. of water was mixed with the pulp, and excess liquid was again removed by filtration. The wet pulp, now containing about 6 g. of monomer, was transferred to an 8-oz. screw-cap bottle, and oxygen was displaced by evacuating four times to about 50 mm. followed by repressuring with nitrogen. The reaction mass was then irradiated with cobalt-60 to 0.5 Mrad and allowed to stand for 2 hours at ambient temperature. The graft copolymer was washed several times with water and stored as a wet filter cake.

TABLE I

| | | | Treatment | | | |
|---|---|---|---|---|---|---|
| Example | Substrate | Washed | Reagent | Temp. (°C.) | Time (hr.) | Ml. oil for 50% transmittance |
| Control (no CTAB) | wheat straw | + | NaOH[a] | 100 | 2 | <<10[b] |

TABLE I-continued

| Example | Substrate | Washed | Treatment Reagent | Temp. (°C.) | Time (hr.) | Ml. oil for 50% transmittance |
|---|---|---|---|---|---|---|
| 1 | wheat straw | + | NaOH[a] | 100 | 2 | 48 |
| 2 | wheat straw | + | NaOH[a] | 25 | 1 | 38 |
| 3 | wheat straw | + | water | 100 | 2 | 25 |
| 4 | wheat straw | + | water | 25 | 64 | 23 |
| 5 | oak sawdust | − | NaOH[a] | 100 | 2 | 46 |
| 6 | pine sawdust | − | NaOH[a] | 100 | 2 | 25 |

[a] 0.24 N NaOH solution.
[b] The initial 10 ml. of oil emulsion reduced the transmittance to about 0.2%.

Weight percent poly(acrylic acid) in the graft copolymer (% add-on) was determined by dispersing 1 g. (dry weight basis) of polymer in 150 ml. of 1 N NaCl solution and then titrating with 0.1 N NaOH solution to a phenolphthalein end point.

Five grams (dry weight basis) of softwood pulp-g-poly(acrylic acid) was suspended in 200 ml. of water in a Waring blender, and the pH was adjusted to 8 with 1 N sodium hydroxide in order to convert the acidic graft copolymer to its sodium salt. Five grams of CTAB were added, and the mixture was stirred for 5 min. The product was separated by filtration and washed three times with 50:50 ethanol/water and three times with water. The polymer was then continuously extracted (Soxhlet) for 2 days with 95% ethanol. The extracted polymer (Sample 8B) was washed with water and stored as the wet filter cake. Its ability to absorb emulsified oil was determined by the procedure described in Example 1. As a basis for comparison, a control (Sample 8A) was also run in which no acrylic acid was grafted onto the pulp. The results are reported in Table II.

EXAMPLE 9

The procedure of Example 8 was repeated except that half the amount of acrylic acid was used, and the percent add-on obtained was 3.4. The results are reported in Table II.

EXAMPLE 10

The procedure of Example 8 was repeated except that 2-acrylamido-2-methylpropanesulfonic acid (AA-SO$_3$H) was substituted for the acrylic acid. The results are given in Table II.

EXAMPLE 11

A stirred slurry of 75.0 g. (dry weight basis) of the softwood pulp used in Examples 8–10 in 3 l. of water was sparged with a slow stream of nitrogen for 1 hour at 25° C. Ten grams of methyl acrylate were added, followed after 5 min. by a solution of 5.0 g. ceric ammonium nitrate in 45 ml. 1 N nitric acid. The mixture was stirred for 2 hours at 25° C.; the polymer was then removed by filtration and resuspended in water, and pH was adjusted to 7 with sodium hydroxide solution. The graft copolymer was washed with water, and the wet filter cake was extracted several times with acetone to remove 1–2 g. of homopolymer. Extracted copolymer was then freed of acetone by water washing and stored as a wet filter cake. A portion of the material was used to determine the percent add-on.

Softwood pulp-g-poly(methyl acrylate) was converted to softwood pulp-g-poly(Na acrylate) by thoroughly mixing 6.0 g. (dry weight basis) of graft copolymer with 10 ml. of 1 N sodium hydroxide and 10 ml. of water. The resulting mixture was heated in a loosely stoppered flask in a 100° C. oven for 6 hours. The saponified polymer was washed with water until the slurry pH was 8.9, and was then stored as the wet filter cake. A portion of the graft copolymer was converted to carboxylic acid by stirring with 0.5 N HCl, filtering, and washing with water until the slurry pH was 5.4. Titration showed 5.4% poly(acrylic acid).

Eight grams (2.1 dry weight basis) of the wet filter cake was blended with 100 ml. of water, and the slurry pH was adjusted to 8 with 1 N NaOH solution. The resulting dispersion was stirred for 5 min. with 2.2 g. of CTAB. The solid was recovered by filtration and washed and extracted by the same procedure described in Example 8. The absorbency of the copolymer before saponification and CTAB reaction (Sample 11A) was compared to that after reaction (Sample 11B). The results are reported in Table II.

EXAMPLE 12

The procedure of Example 8 was repeated. The extent of reaction with CTAB was determined from Kjeldahl nitrogen analyses before and after the reaction. These values were 0.016% and 0.43%, respectively, indicating that 37% of the carboxyl groups in the graft copolymer had reacted.

It is understood that the foregoing detailed description is given merely by way of illustration and that modification and variations may be made therein without departing from the spirit and scope of the invention.

TABLE II

| Example | Monomer | Initiator | % Add-on | Ml. oil for 50% transmittance |
|---|---|---|---|---|
| 8A (control) | none | cobalt-60 | 0 | <<10[a] |
| 8B | acrylic acid | cobalt-60 | 6.5 | 45 |
| 9 | acrylic acid | cobalt-60 | 3.4 | 65 |
| 10 | AASO$_3$H | cobalt-60 | 4.1 | 40 |
| 11A | methyl acrylate[b] | Ce$^{+4}$ | 8 | <<10[a] |
| 11B | methyl acrylate[c] | Ce$^{+4}$ | 8 | 110 |

[a] The initial 10 ml. of oil emulsion reduced the transmittance to 0.3% or less.
[b] The graft copolymer was neither saponified nor reacted with CTAB.
[c] The graft copolymer was saponified and then reacted with CTAB.

We claim:

1. A composition for absorbing oil from oil-in-water emulsions comprising the reaction product of a cellulose-containing substance having cationic exchange properties and a fatty quaternary ammonium salt.

2. A composition as described in claim 1 wherein said cellulose-containing substance is a natural residue.

3. A composition as described in claim 2 wherein said cellulose-containing substance is sawdust.

4. A composition as described in claim 2 wherein said cellulose-containing substance is a gramineous agricultural residue.

5. A composition as described in claim 1 wherein said cellulose-containing substance is carboxymethylcellulose.

6. A composition as described in claim 1 wherein said cellulose-containing substance is a graft copolymer of cellulose and a carboxylic acid or sulfonic acid-containing monomer, and wherein the amount of polymerized monomer does not exceed about 8% by weight of the graft copolymer.

7. A composition as described in claim 6 wherein said cellulose-containing substance is a graft compolymer of cellulose and acrylic acid or 2-acrylamido-2-methylpropanesulfonic acid.

8. A composition as described in claim 1 wherein said fatty quaternary ammonium salt is hexadecyltrimethylammonium bromide.

* * * * *